F. Lambert,
Brick Mold.
No. 111,066. Patented Jan. 17, 1871.

Section at A.B.

Witnesses.                    Inventor.

F. Lambert,
Brick-Mold.
No. 111,066. Patented Jan. 17, 1871.

Section at C.D.

Witnesses.　　　　　　　　　　　Inventor.

UNITED STATES PATENT OFFICE.

FRANÇOIS LAMBERT, OF LOS ANGELES, CALIFORNIA.

IMPROVEMENT IN THE MODES OF MAKING BRICKS.

Specification forming part of Letters Patent No. 111,066, dated January 17, 1871.

*To all whom it may concern:*

Be it known that I, FRANÇOIS LAMBERT, of Los Angeles, in the county of Los Angeles and State of California, have invented certain new and useful Improvements in the Manufacture of Brick; and do hereby declare the following to be a full, clear, and exact description thereof, reference being had to the accompanying drawing, and to the letters of reference marked thereon.

The nature of my invention consists in the construction and arrangement of a device for making holes in brick after they are made, and before they are dried or burned, said holes to extend from one edge to near the opposite edge, for the purpose of excluding sound, when such bricks are used in partition walls, &c.

In order to enable others skilled in the art to which my invention appertains to make and use the same, I will now proceed to describe its construction and operation, referring to the annexed drawing, which forms a part of this specification, in which—

Figure 1:
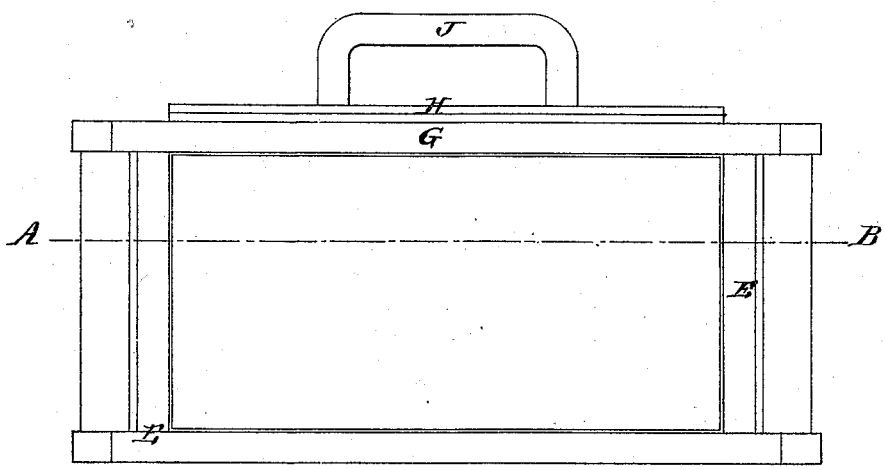
Figure 2:
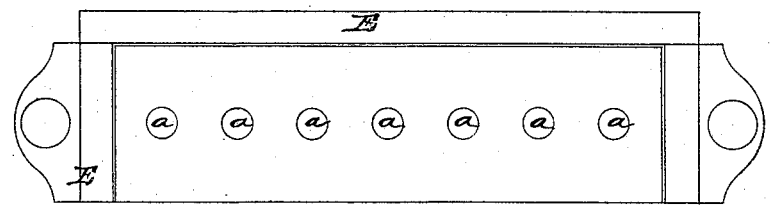
Figure 3:
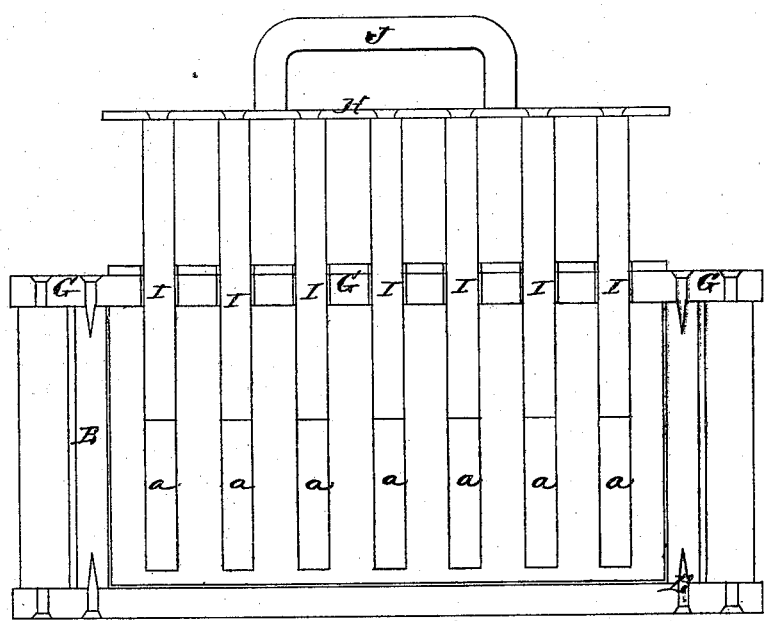
Figure 4:
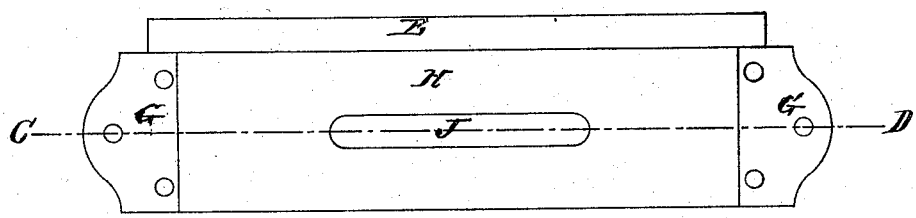

Figure 1 is a side elevation, Fig. 2 a horizontal section, Fig. 3 a longitudinal vertical section, and Fig. 4 a plan view, of my machine.

My invention is not a machine for making brick; neither do I claim any new device in making them. They are made in the ordinary way, and before they are placed in the kiln to be dried and burned they are placed in a mold or box, E, one side of which is left entirely open. This box is so shaped that the brick will stand on its edge, as shown in Figs. 1 and 3, and the top G of the box is perforated with a series of holes, as seen in Fig. 2.

Through the holes in the top G are passed rods I I, all attached to a follower, H, which is provided with a handle, J. The brick being placed in the box E, the follower and rods being first withdrawn, the rods I I are again inserted, and, by means of the handle J, they are forced down into the brick, so as to form holes *a a* in the same, said holes extending to near the opposite edge of the brick, as shown in Fig. 3.

I do not intend to confine myself to the precise shape of the holes described, as they may be made in any shape desired. In some of the brick-machines now in use they may be made at the same time and with the same operation as the bricks are molded, in which case my machine may be dispensed with.

These bricks have the property of excluding sound when used in partition-walls, &c., according to the position in which they are placed—to wit, by placing them on edge with the orifices downward. Used in the interior of buildings, theaters, and concert-saloons, they have excellent acoustic properties, by placing them lengthwise, with the orifices toward the back of each brick inside of the wall, following one after the other.

I am aware that bricks have been made with a series of holes, for the purpose of being better burned throughout; but such holes have been afterward filled up with mortar, ashes, or some non-conducting substance, while mine remain open, which is the only way in which they are to be used for the purposes mentioned.

Having thus fully described my invention, what I claim as new, and desire to secure by Letters Patent, is—

1. The combination of the box E, perforated top G, follower H, and rods I I, for the purpose of forming a series of holes in bricks before they are burned.

2. As a new article of manufacture, the within-described brick, for the purposes set forth.

FRANÇOIS LAMBERT.

Witnesses:
LOUIS F. LE BRUN,
MYRON NORTON.